UNITED STATES PATENT OFFICE.

BENNO HOMOLKA, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT DYESTUFFS AND PROCESS OF MAKING SAME.

1,209,163.      Specification of Letters Patent.      Patented Dec. 19, 1916.

No Drawing.      Application filed July 30, 1915. Serial No. 42,754.

*To all whom it may concern:*

Be it known that I, BENNO HOMOLKA, Th. D., chemist, a citizen of the Empire of Germany, residing at Frankfort-on-the-Main, Germany, have invented certain new and useful Improvements in new Vat Dyestuffs and Processes of Making Same, of which the following is a specification.

By the action of para-quinones upon arylamino-acetic acids, insoluble bodies are obtained having the character of vat dyestuffs. They are formed by the combination of one molecular proportion of quinone and two molecular proportions of arylamino-acetic acid with elimination of hydrogen and carbonic acid, which transformation occurs in the simplest typical case of the action of benzoquinone upon phenylglycin, according to the following equation:

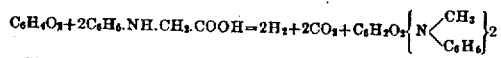

The new body thus obtained may, therefore, be regarded as dimethyl-dianilinoquinone and constitutes the most simple representative of the dimethyl-diarylaminoquinones obtainable by the process above referred to.

The above-mentioned reaction occurs on heating in an aqueous solution; however as both the para-quinones and the arylaminoacetic acids are scarcely soluble in water, it is advisable to use such organic solvents as can be mixed with water, such, for instance, as methyl-alcohol, ethyl-alcohol, acetic acid or the like.

The following examples illustrate my invention, the parts being by weight:

*Example I.*—*Vat dyestuff from benzoquinone and phenylamino. acetic acid (phenylglycin).*—100 parts of benzoquinone are dissolved in a mixture of 500 parts of alcohol and 100 parts of water, whereupon 50 parts of phenylamino-acetic acid (phenlyglycin) are added and the whole heated. When the heat has risen to about 40–50° C., a violent evolution of carbonic acid sets in, upon the termination of which the whole is further heated to boiling for about one hour. After cooling, the dyestuff which has separated is filtered off, washed with alcohol and dried. The dyestuff thus obtained forms brown crystals melting at 232° C. with decomposition. It is insoluble in water, in dilute acids and alkalis, almost insoluble in the usual organic solvents of a low boiling point, such as alcohol, ether, acetone, benzene, however readily soluble with an orange-yellow color in boiling glacial acetic acid and xylene, and with a red color in concentrated sulfuric acid. The dyestuff gives, when dissolved in an alkaline solution of hydrosulfite, a colorless vat which dyes the animal fiber fast yellow tints.

*Example II.*—When using 100 parts of benzoquinone and 55 parts of ortho-tolylamino-acetic acid (ortho-tolylglycin) and working in the manner indicated in Example I), a reddish-brown crystalline body is obtained which melts at 243° C. with decomposition and possesses the same properties as that obtainable according to Example I), being, however, distinguished from the latter by the bluish-red color of its solution in sulfuric acid. The new body may be regarded as dimethyl-di-orthotolyl-diaminoquinone (dimethyl - di - orthotoluidino-quinone); it dyes in the vat wool yellow tints.

*Example III.*—*Dyestuff from dichloroquinone and phenylaminoacetic acid (phenylglycin).*—75 parts of dichloro-quinone and 135 parts of phenylamino-acetic acid (phenylglycin) are dissolved together in acetic acid of 70 per cent. strength and heated in the water bath. After cooling, the resulting dyestuff is filtered off, washed with acetic acid and with water and dried. The new body, which is to be regarded as dimethyl-dianilino-dichloroquinone, is fusible with extensive decomposition, without any precise melting point; it is insoluble in water, in diluted acids and alkalis, almost insoluble in the usual organic solvents, such as alcohol, ether, acetone, benzene, soluble in concentrated sulfuric acid with a violet color. It dyes in the vat wool yellow tints. A quite similar dyestuff is obtained by using instead of 75 parts of dichloro-quinone, 100 parts of chloranil.

Having now described my invention, what I claim is:

1. The process of making new vat dyestuffs, which consists in heating para-quinones with arylamino-acetic acids in a suitable solvent.

2. As new commercial products, dimethyldiaryl-amino-para-quinones, which constitute brown crystalline powders, being insoluble in water, diluted acids and alkalis, practically insoluble in alcohol, ether and benzene, soluble with a bluish-red color in concentrated sulfuric acid, and yielding colorless vats which give yellow tints on the animal fiber.

8. As a new commercial product, the vat dyestuff of the formula:

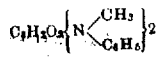

which constitutes a brown crystalline powder, melting at 232° C. with decomposition, being insoluble in water, in diluted acids and alkalis, practically insoluble in alcohol, ether and benzene; soluble with an orange-yellow color in boiling xylene and glacial acetic acid, with a red color in concentrated sulfuric acid; yielding, when dissolved in an alkaline solution of hydrosulfite, a colorless vat which gives yellow tints on the animal fiber.

In testimony whereof I affix my signature in presence of two witnesses.

BENNO HOMOLKA.

Witnesses:
 JEAN GRUND,
 CARL GRUND.